W. NEWBY.
INSULATOR PRESS.
APPLICATION FILED MAR. 25, 1913.

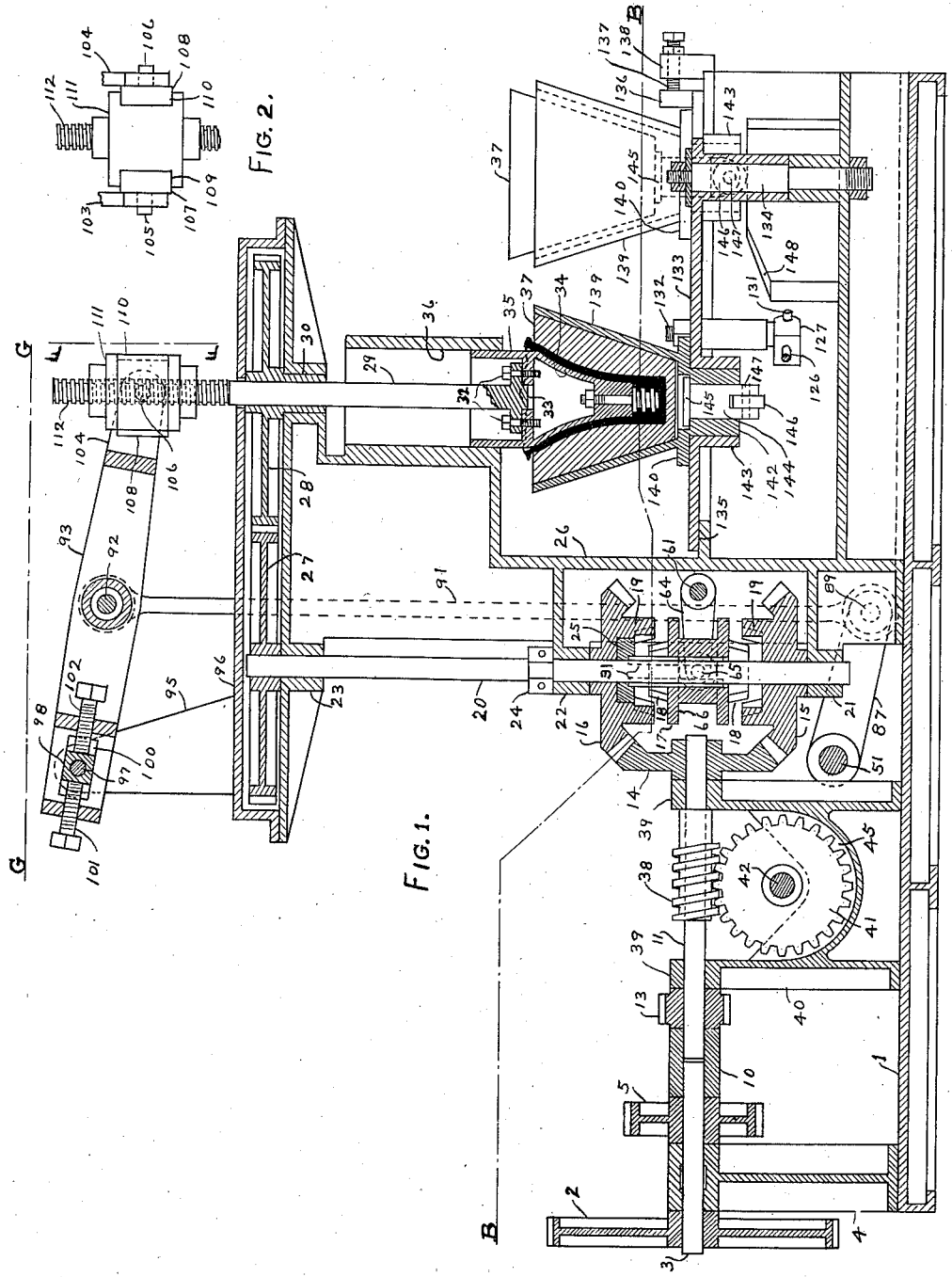

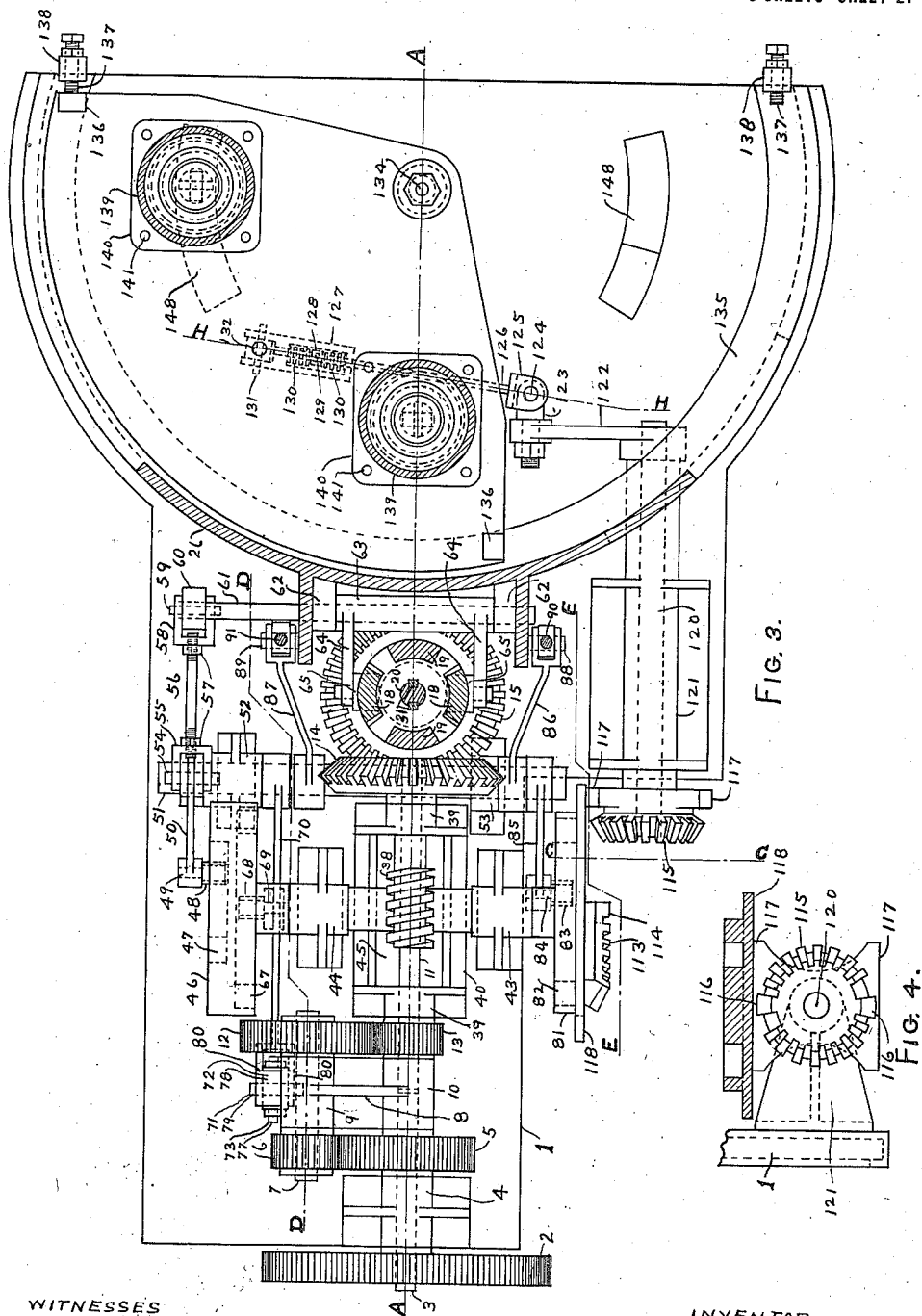

1,226,795.

Patented May 22, 1917.
3 SHEETS—SHEET 3.

WITNESSES

INVENTOR
Wm Newby

UNITED STATES PATENT OFFICE.

WILLIAM NEWBY, OF YOUNGSTOWN, OHIO, ASSIGNOR TO WILLIAM I. LOURIE, OF YOUNGSTOWN, OHIO.

INSULATOR-PRESS.

1,226,795.

Specification of Letters Patent.

Patented May 22, 1917.

Application filed March 25, 1913. Serial No. 756,699.

*To all whom it may concern:*

Be it known that I, WILLIAM NEWBY, a citizen of the United States of America, residing at Youngstown, in the county of Mahoning and State of Ohio, have invented certain new and useful Improvements in Insulator-Presses, of which the following is a specification, reference being had therein to the accompanying drawings.

This invention relates to mechanical presses for forming bowls, cups, tumblers and suitable like articles from such plastic materials as clay or glass, and more especially for forming such articles as insulators having a thread formed in them.

The primary object of this invention is to provide a machine for forming such articles with extreme accuracy and quickness, and in which all the movements and operations are positive and automatic.

A further object of this invention is to provide mechanism for successively placing a plurality of molds under the center of a revolving former, then to bring the former down to the work quickly, then to force the former into the clay or glass by revolving its spindle in a master nut having a thread of the same pitch as the thread to be formed in the article; the nut being held against movement during this part of the operation, to gradually slow up the former when nearing the bottom of its movement until it is almost stationary when at the exact bottom of its movement, then to reverse the motion of the former and to start it backward slowly, gradually increasing its speed until it is up to its normal speed, to back it out of the work by revolving its spindle in the master nut until the former is entirely free from the work, then to raise the former quickly to its upper position where it is free from the mold, to maintain the former in this position while the mold containing the finished article is being moved away from under the former and another one brought in its place, then to slow up the former, then to reverse it and to start it forward slowly, gradually increasing its speed until it is up to the normal; while at the same time it is being brought down to the work as before.

The invention comprises certain novel combinations of devices for effecting these several movements and operations of the former and the molds and for insuring a successive rotation thereof.

The construction of the mechanism will be fully described hereinafter in connection with the accompanying drawings which form a part of this specification and the novel and characteristic features of the invention will be defined in the appended claims.

Figure 5:
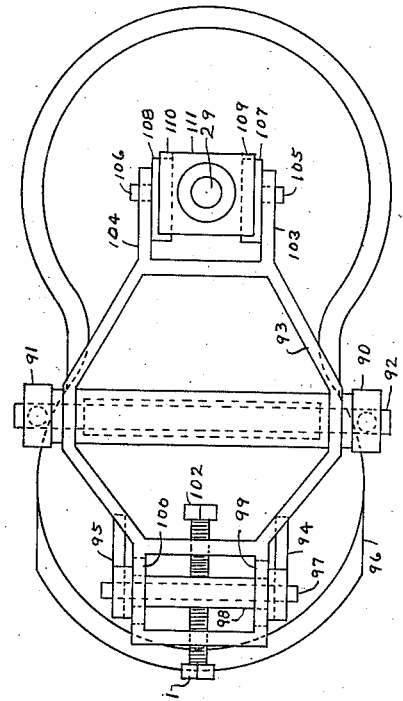
Figure 8:
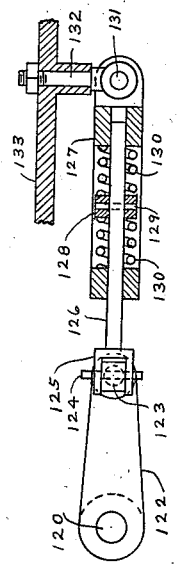
Figure 6:
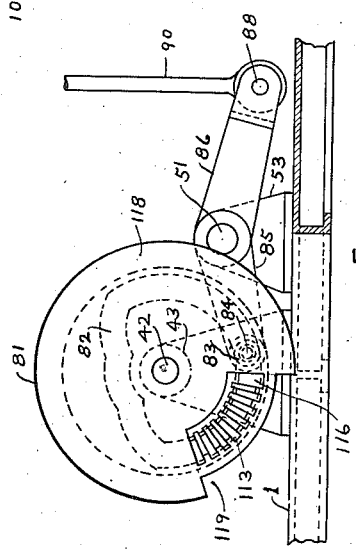
Figure 7:
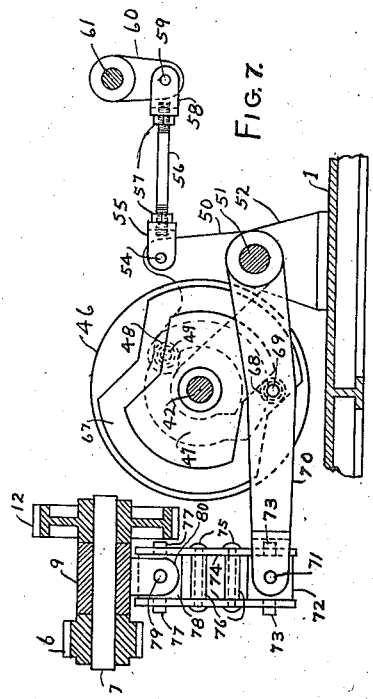

In the drawings, Figure 1 is a vertical cross section through the center of the machine on the line A—A of Fig. 3, Fig. 2 is a view looking at the machine on the line F—F of Fig. 1, Fig. 3 is a plan view; partly in section; taken on the line B—B of Fig. 1, Fig. 4 is a section on the line C—C of Fig. 3, Fig. 5 is a plan view of the top of the machine on the line G—G of Fig. 1, Fig. 6 is a section on the line E—E of Fig. 3, Fig. 7 is a section on the line D—D of Fig. 3. Fig. 8 is a section on the line H—H of Fig. 3.

In order to more fully describe the working of the machine and to avoid confusion, I will describe the mechanism for performing each of the several operations separately.

The base of the machine consists of a bed-plate 1, upon which is mounted the several bearing stands and which forms a rigid tie between them all.

The machine is driven by a gear or pulley 2, secured to a shaft 3, which is supported in a bearing 4. On the other end of the shaft 3 is secured a gear 5, which meshes into a gear 6 secured to a shaft 7, supported in a bearing 9 formed in a swinging bracket 8, which is pivoted to the shafts 3 and 11 by means of the bearing 10. On the other end of the shaft 7 is secured a gear 12 which meshes into a gear 13 secured to the shaft 11. On the other end of the shaft 11 is secured a gear 14 which meshes into two gears 15 and 16 which are carried on and free to revolve on a shaft 20 which is supported in bearings 21, 22 and 23 formed on a stand 26. The gears 15 and 16 have clutch jaws 19 formed on their inner hubs and which are adapted to be engaged alternately in clutch jaws 18 formed on a sliding clutch 17. The clutch 17 rotates the shaft 20 by means of feather keys 31. On the top end of the shaft 20 is secured a gear 27 which meshes into a gear 28 which is supported by its hub in a bearing 30, passing through the gear 28 and rotated thereby is a sliding spindle 29 upon the lower end of which is connected (by means of bolts 32 and a centering teat 33) a former 34 having an upwardly extending ring 35 by means of which the former is guided in a bearing 36 formed in the stand 26. It will be understood that the foregoing mechanism is for the purpose of rotating the former, and it will be noticed in Fig. 1, that the bearing 36 is large enough for the former 34 to pass up into it, by this arrangement the guide for the former is brought close down to the mold 37; thereby eliminating vibration in the former when in its lower or working position.

A worm 38 is secured to the shaft 11 between the bearings 39 which are formed in the stand 40. The worm 38 is meshed into a worm wheel 41 secured to a shaft 42, which is supoprted in bearings 43 and 44. The oiling of the worm 38 and the worm wheel 41 is obtained by the worm wheel revolving in an oil cellar 45 formed in the stand 40.

On one end of the shaft 42 is secured a cam wheel 46 having on its one side a cam groove 47, engaged in which is a roller 48 carried on a pin 49 which is fastened into a lever 50 loosely pivoted on to a shaft 51 which is supported in bearings 52 and 53. Connected to a third point in the lever 50; by means of a pin 54; is a clevis 55, which is threaded and connected to an adjustable connecting rod 56 having jam nuts 57, by which it is locked after adjustment. The other end of the connecting rod 56 is threaded and screwed into a second clevis 58 which is connected by a pin 59 to a lever 60 secured to a shaft 61, which is supported in bearings 62 formed on the stand 26. Secured to the shaft 61; between the bearings 62; is a lever 63 having two arms 64, in the outer end of which is carried two rollers 65 engaged in the groove 66 of the clutch 17. It will be understood, that as the cam wheel 46 revolves, it rocks the lever 50 back and forth and consequently shifts the clutch 17 up and down, thereby alternately engaging the gears 15 and 16 and consequently reversing the motion of the shaft 20, the spindle 29 and the former 34.

On the other side of the cam wheel 46 is a cam groove 67, engaged in which is a roller 68 carried on a pin 69 fastened into the lever 70, which is pivoted on the one end on the shaft 51 and has on its other end a pin 71 passing through and supporting a block 72 having trunnions 73 which are engaged in side rods 74 connected together in their center by bolts or rivets 75 and separators 76 and engaged in their top end to trunnions 77 formed on a block 78 which is in turn connected by a pin 79 to lugs 80 formed on the swinging bracket 8. The object of this mechanism is to gradually slow up the shaft 11, the gears 14, 15 and 16 and consequently the former 34 and to bring them to almost a dead stop when the former is at the bottom and the top of its movement, at which point, the former is reversed by the clutch 17 being shifted from engagement with one of the gears 15 or 16 to the other, as is shown in Fig. 1. This slowing up is accomplished by the roller 68 following the cam groove 67, thereby moving the lever 70, the side rods 74 and swinging the bracket 8 and thereby revolving the gears 6 and 12 in the direction in which the gears 5 and 13 are rotating.

On the other end of the shaft 42 is secured a cam wheel 81 having on its one face, a cam groove 82 engaged in which is a roller 83 carried on a pin 84 fastened into a lever 85 fastened to the shaft 51. Also fastened to the shaft 51 are two levers 86 and 87, which are connected by pins 88 and 89 to connecting rods 90 and 91 which are in turn connected by a rod 92 to a lever 93. The rear end of the lever 93 is adjustably pivoted to brackets 94 and 95 formed on the gear cover 96, by means of a pin 97 passing through a pivot block 98, which supports the lever 93 by means of slots 99 and 100 and which is adjusted by means of the set screws 101 and 102. The front end of the lever 93 is formed into two arms 103 and 104, supported in which by means of pivot pins 105 and 106 are two shifter blocks 107 and 108 arranged to slide in slots 109 and 110 formed in a nut 111, which is connected to the spindle 29 by means of a thread 112, which is made of a pitch suitable to the pitch of the thread to be formed in the article. The object of this mechanism is to save time in the operation of forming each article, by raising the former quickly to a point where it will clear the mold, after it has cleared the thread in the article by its spindle revolving in the nut, and to lower the former quickly down to the work after the next mold has been brought into place, and to provide mechanism for adjusting the depth of the former into the article to be formed. The operation of this mechanism is as follows,—As the mold 37; containing a quantity of plastic material; is brought into place, the offset in the cam groove 82 will become engaged with the roller 83, thereby rocking the lever 85, the shaft 51, the levers 86, 87 and 93 and thereby lowering the nut 111 and the former 34. The roller 83 will then run into a circular section of the groove 82, thereby holding the nut 111 stationary while the former will be forced into and complete the formation of the article by its spindle 29 revolving in the nut 111, and while the former is reversed and backed out of the threaded portion of the article. The roller 83 will then become engaged with a reverse offset in the groove 82, thereby raising the former to its upper position, when the roller 83 will run into a second circular section of the groove 82, thereby holding the nut stationary until the next mold is brought into place. The adjustment of the depth of the former is obtained by screwing in or out the set screws 101 and 102, thereby changing the fulcrum point of the lever 93, increasing or decreasing the length of its rear end and consequently increasing or decreasing the movement of its front end; carrying the nut; and thereby increasing or decreasing; as the case may be; the depth to which the former will be brought in its lower and upper positions.

On the outside face of the cam wheel 81 is a section of a gear 113 in which the first tooth 114 is increased in width, for the purpose of withstanding the shock as it comes into mesh with the gear 115, in which the first meshing teeth 116 are also increased in width for the same purpose. On the hub of the gear 115 is formed flat surfaces 117 having a sliding contact on the face 118 of the wheel 81 for the purpose of locking the gear 115 against rotation when the teeth of the two gears are not in mesh. In the face 118 is a section cut away 119 so as to permit the lock 117 to revolve as the teeth of the two gears come into mesh. The gear 115 is secured to one end of a shaft 120 supported in a bearing 121, on the other end of the shaft 120 is secured a crank 122, in the outer end of which is a pin bolt 123 connected by means of a pin 124 to a clevis 125 formed on a connecting rod 126, which passes into a box clevis 127 and which is secured thereto in a flexible manner by means of a collar 128 (secured to the rod by a pin 129) and by springs 130 arranged to bear between the collar 128 and the box clevis 127. The box clevis 127 is connected by means of a pin 131 to a pin bolt 132, which is connected to a swinging table 133, which is pivoted to the stand 26 by means of the pin 134 and supported on the stand by means of the bearing surfaces 135. On the table 133 are lugs 136 arranged to come in contact with adjusting screw stops 137 fixed in lugs 138 formed on the stand 26. The molds 37 are carried in mold pots 139 having a flange 140 resting on the table 133 and secured to the table by means of bolts 141 and securely held in place against movement by a downward extending base 142 fitting into a recess 143 formed in the table. Carried in the base of the mold pot 142 is a plunger 144 having an enlarged head 145 and carrying a roller 146 by means of a pin 147 in its lower end. On the stand 26 are circular inclined planes 148, arranged in such a manner, that the rollers 146 will roll up on them as the table rotates, so as to raise the molds for removal.

The object of this mechanism is to rotate the mold table alternately back and forth, bringing the molds alternately under the center of the former for the purpose of pressing, and forming the article and away from the former for the purpose of removing the mold and placing another one in the mold pot.

The operation of this mechanism is as follows: When the former has finished an article and is raised to its upper position, the section of gear 113 has reached a point in its rotation where it becomes engaged with the gear 115 and remains engaged until it has rotated the gear 115 one half of a revolution, thereby swinging the crank 122 one half of a revolution and the mold table 133 the distance of the mold centers. The throw of the crank 122 is made somewhat more than the amount necessary to swing the table the required distance, the table is brought to a stop at the exact point by the adjusting screws 137, and the overthrow and lost motion is taken up by compression of the springs 130.

I would have it understood that the invention is not restricted to the exact construction of mechanism shown and described, as various modifications in the construction and relative arrangement of the parts of the mechanism may be resorted to without departing from the spirit of the invention and the scope of the following claims.

What I claim and desire to secure by Letters Patent, is;—

1. In an insulator press, the combination of a supporting base, a mold table thereon provided with a mold, a vertically movable rotatable former adapted to coöperate with said mold, means for lowering and raising the former, and means embodying gearing and cam mechanism for rotating it at varying speeds.

2. In an insulator press, the combination of a supporting base, a mold table thereon provided with a mold, a vertically movable rotatable former adapted to coöperate with said mold, means for lowering and raising the former, and means embodying gearing and cam mechanism for rotating the former at a diminishing speed on lowering and at an increasing speed on raising.

3. In an insulator press, the combination of a supporting base, a mold table thereon provided with a mold, a vertically movable rotatable former adapted to coöperate with said mold, means for lowering and raising the former embodying screw mechanism for lowering and raising the former within the mold at slow speed and cam-actuated lever mechanism for lowering and raising it at an increased speed into and out of the mold, and means for rotating the former.

4. In an insulator press, the combination of a supporting base, a mold table thereon provided with a mold, a vertically movable rotatable former adapted to coöperate with said mold, means for lowering and raising the former embodying screw mechanism for lowering and raising the former within the mold at slow speed and cam-actuated lever mechanism for lowering and raising it at an increased speed into and out of the mold, means for varying the leverage of said lever mechanism, and means for rotating the former.

5. In an insulator press, the combination of a supporting base, a mold table thereon provided with a mold, a vertically movable rotatable former adapted to coöperate with said mold, means embodying cam mechanism for lowering the former at a maximum speed into the former and for decreasing its speed within the former, means for reversing the movement of the former on withdrawal and for slowly raising the former within the mold and for increasing its speed of removal therefrom, and means for rotating the former.

6. In an insulator press, in combination, a supporting base, a rotatable table thereon, means for rotatably actuating the table, a plurality of molds on the table, a superimposed frame having an integral spindle and gearing support and a plunger guide, a plunger having an actuating spindle and a portion co-acting with the plunger guide, gearing on said gearing support for rotating the spindle in opposite directions, a nut engaging a threaded terminal of the spindle, a lever engaging said nut, and means for actuating said lever.

7. In an insulator press, in combination, a supporting base, a rotatable table thereon, means for rotatably actuating the table, a plurality of molds on the table, a superimposed plunger guide, a plunger having an actuating spindle and a portion co-acting with the plunger guide, gearing for rotating the spindle in opposite directions, a nut engaging a threaded terminal of the spindle, a lever engaging said nut, means for varying the leverage thereof, and means for actuating said lever.

8. In an insulator press, in combination, a supporting base, a rotatable table thereon, means for rotatably actuating the table, a plurality of molds on the table, a superimposed plunger guide, a plunger having an actuating spindle and a portion co-acting with the plunger guide, gearing for rotating the spindle in opposite directions, a nut engaging a threaded terminal of the spindle, a lever having at one end a sliding engagement with said nut and an adjustable fulcrum, and means for actuating said lever.

9. In an insulator press, in combination, a supporting base, a mold table thereon alternately operable around a pivoting center for a portion of a revolution, means for reciprocably actuating the table, a plurality of molds on the table, a superimposed frame having a rigidly incorporated gearing and spindle support and a spindle guide, a plunger having a co-acting telescoping guide portion operable in said guide, a reciprocable and rotatable spindle connected with the plunger having a threaded terminal, gearing for rotating the spindle in opposite directions, means embodying clutch mechanism for actuating said gearing, a nut engaging the spindle terminal, a fulcrum bracket extending from the superimposed frame having a bearing, a lever adjustably mounted on said pin at one end and slidably engaging the spindle nut by its other end, and means for actuating said lever.

10. In an insulator press, in combination, a supporting base, a mold table thereon alternately operable around a pivoting center for a portion of a revolution, means for reciprocably actuating the table, a plurality of molds on the table, a superimposed frame having a rigidly incorporated gearing and spindle support and a spindle guide, a plunger having a co-acting telescoping guide portion operable in said guide, a reciprocable and rotatable spindle connected with the plunger having a threaded terminal, gearing for rotating the spindle in opposite directions, means embodying clutch mechanism for actuating said gearing, a nut engaging the spindle terminal, a fulcrum bracket extending from the superimposed frame having a bearing, a lever adjustably mounted on said pin at one end and slidably engaging the spindle nut by its other end, a connecting rod engaging said lever, and cam mechanism for actuating said connecting rod and lever.

11. In an insulator press, in combination, a supporting base, a mold table thereon alternately operable around a pivoting center for a portion of a revolution, an actuating crank having a connecting rod, a box clevis connected to the table slidably engaging said rod with intervening abutment and spring mechanism, limiting stops for the table, a plurality of molds on the table, a vertically movable rotatable former adapted to coöperate with each of said molds, means for lowering and raising the former, and means for rotating it.

12. In combination with a mold, a forming plunger having a thread, a reciprocable and rotatable spindle therefor having a threaded terminal, gearing in splined engagement with the spindle for rotating it, a supporting frame for said gearing having a rigid portion providing guiding means for centralizing the spindle and plunger with relation to the mold, a lever having a nut engaging the spindle terminal, and means for actuating the lever.

13. In combination with a mold, a forming plunger having a thread, a reciprocable and rotatable spindle therefor having a threaded terminal, gearing in splined engagement with the spindle for rotating it, a supporting frame for said gearing having a rigid portion providing guiding means for centralizing the spindle and plunger with relation to the mold, a lever having a bifurcated terminal and slidable blocks, a nut engaging the spindle terminal and said blocks, and means for actuating the lever.

14. In combination with a mold, a forming plunger having a thread, a reciprocable and rotatable spindle therefor having a threaded terminal, gearing in splined engagement with the spindle for rotating it, a supporting frame for said gearing having a rigid portion providing guiding means for centralizing the spindle and plunger with relation to the mold, a lever having a bifurcated terminal and slidable blocks, a nut engaging the spindle terminal and said blocks, means for varying the leverage of the lever, and means for actuating the lever.

In testimony whereof I affix my signature in the presence of two witnesses.

WILLIAM NEWBY.

Witnesses:
G. F. TARHER,
F. J. YESTADT.